(12) United States Patent
Lee (10) Patent No.: US 12,172,715 B2
(45) Date of Patent: Dec. 24, 2024

(54) LINK SEAL OF CRAWLER TRACK AND METHOD THEREOF

(71) Applicant: Ki Kwang Lee, Siheung-si (KR)

(72) Inventor: Ki Kwang Lee, Siheung-si (KR)

( * ) Notice: Subject to any disclaimer, the term of this patent is extended or adjusted under 35 U.S.C. 154(b) by 0 days.

(21) Appl. No.: 18/258,649

(22) PCT Filed: Feb. 17, 2023

(86) PCT No.: PCT/KR2023/002311
§ 371 (c)(1),
(2) Date: Jun. 22, 2023

(87) PCT Pub. No.: WO2023/204415
PCT Pub. Date: Oct. 26, 2023

(65) Prior Publication Data
US 2024/0375729 A1    Nov. 14, 2024

(30) Foreign Application Priority Data
Apr. 21, 2022  (KR) .......................... 10-2020-0049250

(51) Int. Cl.
*B62D 55/08*    (2006.01)
*B62D 55/088*   (2006.01)

(52) U.S. Cl.
CPC ................................ *B62D 55/0887* (2013.01)

(58) Field of Classification Search
CPC .... B62D 55/0887; F16J 15/38; F16J 15/3208; F16J 15/3232; F16J 15/3456; F16J 15/344
See application file for complete search history.

(56) References Cited

U.S. PATENT DOCUMENTS

| | | | | |
|---|---|---|---|---|
| 2,326,489 A | * | 8/1943 | Payne | F16J 15/38 277/395 |
| 4,179,130 A | * | 12/1979 | Fass | F16J 15/3456 277/371 |
| 4,461,488 A | * | 7/1984 | Harms | B62D 55/0887 277/380 |
| 4,641,858 A | * | 2/1987 | Roux | F16L 17/025 285/94 |
| 4,744,571 A | * | 5/1988 | Geberth, Jr. | F16J 15/3208 277/560 |
| 8,668,204 B2 | * | 3/2014 | Reeb | F16J 15/3236 277/551 |
| D894,797 S | * | 9/2020 | Lee | D12/159 |

FOREIGN PATENT DOCUMENTS

| | | | |
|---|---|---|---|
| JP | 54-17541 U | | 2/1979 |
| JP | 2000168643 A | * | 6/2000 |
| KR | 20180113682 A | * | 10/2018 |
| KR | 10-2322467 B1 | | 11/2021 |

* cited by examiner

*Primary Examiner* — Vishal A Patel
(74) *Attorney, Agent, or Firm* — NKL Law; Jae Youn Kim (57) ABSTRACT

The present invention relates to a link seal of a crawler track, and a method of manufacturing the same. During the manufacturing of the link seal, a shape restoration part is formed integrally on the link seal body in order to enhance the restorative force partially or entirely and without needing additional ring-shaped shape restoration member, so the link seal of a crawler track does not need assembly work of the link seal, has a simple structure, can maintain the restorative force of the link seal for a long time without elongation of the ring-shaped shape restoration member, and remarkably reduce manufacturing costs of the link seal.

2 Claims, 6 Drawing Sheets

LINK SEAL OF CRAWLER TRACK AND METHOD THEREOF

TECHNICAL FIELD

The present invention relates to a link seal of a crawler track and a manufacturing method thereof, and more specifically, to a link seal of a crawler track, which is mounted on a track axle of a crawler type track mounted on a tank, an armored vehicle, a bulldozer, an excavator, etc., and which improves a link seal structure so as to maintain the restorative force of the link seal due to the compression and expansion transmitted in an axial direction of a bushing for a long time, reduce the manufacturing cost, and have a simple assembly structure, and a manufacturing method thereof.

BACKGROUND ART

Generally, a crawler track vehicle is a vehicle that runs on two crawler tracks, which are respectively attached to both sides of the vehicle body, and includes a tank, an armored vehicle, a bulldozer, an excavator, etc. The crawler track is a device that hangs a belt made of a steel plate around the circumference of a wheel. Since the crawler track has a large contact area with the ground, it can go on rough roads and uphill roads.

Conventionally, such a crawler track has a link seal installed at the coupling part where inner and outer links are combined so that oil, etc., injected into an internal friction part does not leak out. The inner link and the outer link of the link seal are coupled by a fixing pin, a bushing is coupled to the outside of the fixing pin, and the link seal is inserted and installed between the outer link and the front end of the bushing. In connection with the link seal, Japanese Utility Model Publication No. 54-17541 (Reference Document 1) proposed a sealing device of the link joint part of a crawler track in which a pair of link seals are inserted in different directions.

However, in the technology proposed in Reference Document 1, while providing a certain buffering function of compression and expansion when the impact force due to transportation of the crawler track is transmitted, if a severe impact force acts in an axial direction of a bushing, the link seal may not properly respond to the impact force, thereby causing a damage to the parts or degradation of the function of retaining lubricating oil injected inside without leakage due to friction wear, necessitating frequent replenishment of lubricating oil, and shortening the lifespan when foreign substances infiltrate from the outside.

Of course, to solve the problems of Reference Document 1, Korean Patent Registration No. 10-2322467 (Reference Document 2) has been proposed. Reference Document 2 relates to a link seal for a crawler track, which can double restorative force in a compressed state of the link seal due to the load and impact transmitted in the axial direction of the bushing since having restoration rings installed on the inner and outer surfaces of the link seal.

However, Reference Document 2 has disadvantages in that work is cumbersome since the link seal and the restoration rings are manufactured separately and the restoration rings are fit and installed on the inner and outer surfaces of the link seal, in that assembly time gets longer, and in that manufacturing costs are increased.

In addition, in the state in which the restoration rings are installed and the link seal is fit to the fixing pin installed on the inner and outer links, when the link seal is compressed and expanded by impact force in the axial direction of the bushing, there is a problem that the restorative force of the link seal weakens due to the elongation of the restoration rings supported by the link seal.

DISCLOSURE

Technical Problem

Accordingly, the present invention has been made in view of the above-mentioned problems occurring in the related art, and it is an object of the present invention to provide a link seal of a crawler track, which is mounted on a track axle of a crawler type track mounted on a tank, an armored vehicle, a bulldozer, an excavator, etc., and which improves a link seal structure so as to maintain the restorative force of the link seal due to the compression and expansion transmitted in an axial direction of a bushing for a long time, reduce the manufacturing cost, and a manufacturing method thereof.

It is another object of the present invention to provide a link seal of a crawler track, and a manufacturing method thereof, which can prevent weakening of restorative force of the link seal for a long time even if the compression and expansion of the link seal due to the impact force in the axial direction of the bushing occur repeatedly in the state where the link seal is fit to the fixing pins installed on the inner and outer links.

Technical Solution

To accomplish the above-mentioned objects, according to the present invention, there is provided a link seal of a crawler track including: a link seal body, which has a doughnut shape, and includes an insertion hole formed penetratingly at the inner center, a support portion protruding from the outer center, and first and second elastic parts protruding from both sides of the support part to be spaced apart from each other and to have contact space parts with a certain space; and a shape restoration part, which is integrally formed the link seal body to enhance restorative force of the link seal body, wherein a support flange with a narrow entrance is formed on the inner side of the contact space part to prevent separation of the shape restoration part, and wherein the shape restoration part is integrally bonded to a molding groove of the link seal body through dual injection with EPDM.

In addition, in another aspect of the present invention, there is provided a method of manufacturing a link seal of a crawler track, including: a first step of molding a link seal body in such a way that an insertion hole of a doughnut shape is penetratingly formed at the inner center using a first synthetic resin material, a support portion protrudes from the outer center, and first and second elastic parts protrude from both sides of the support part to be spaced apart from each other and to have contact space parts with a certain space; and a second step of molding a shape restoration part on a portion or the entire of the link seal body with a second synthetic resin material through double-injection with EPDM, wherein in the first step, the link seal body has a support flange with a narrow entrance, which is formed on the inner side of the contact space part to prevent separation of the shape restoration part.

Advantageous Effects

According to the present invention, during the manufacturing of the link seal, a shape restoration part is formed integrally on the link seal body in order to enhance the restorative force partially or entirely and without needing additional ring-shaped shape restoration member, so the present invention does not need assembly work of the link seal, has a simple structure, and can maintain the restorative force of the link seal for a long time without elongation of the ring-shaped shape restoration member.

In addition, according to the present invention, the shape restoration part for increasing restorative force can be formed on the link seal body in various forms through double injection mold without additionally manufacturing a ring-shaped shape restoration member, so the present invention does not need to manufacture and fit additional ring-shaped shape restoration member, thereby remarkably reducing manufacturing costs of the link seal.

MODE FOR INVENTION

Characteristics of a link seal of a crawler track and a manufacturing method thereof according to the present invention will be understood by detailed descriptions of embodiments with reference to the attached drawings.

FIGS. 1 to 4 are drawings for depicting a link seal of a crawler track according to a first embodiment of the present invention.

Referring to the drawings, a link seal 100 of a crawler track according to the present invention is fitted to a fixing pin 3, which penetrates a pair of inner and outer links 1 and 2 of the crawler track vehicle, and is installed a front end between the outer link 2 and the bushing 4 to perform a buffering action and prevent oil leakage.

The link seal 100 of the present invention includes: a link seal body 110, which has a doughnut shape, and includes an insertion hole 111 perforated at the inner center, through which the fixing pin 3 of the crawler track passes, a support part 112 protruding from the outer center, and first and second elastic parts 114 and 115 protruding from both sides of the support part 112 to be spaced apart from each other and to have contact space parts 113 with a certain space; and a shape restoration part 120, which is integrally formed on a portion or the entire of the link seal body 110 and enhances restorative force of the link seal body 110.

Figure 1:
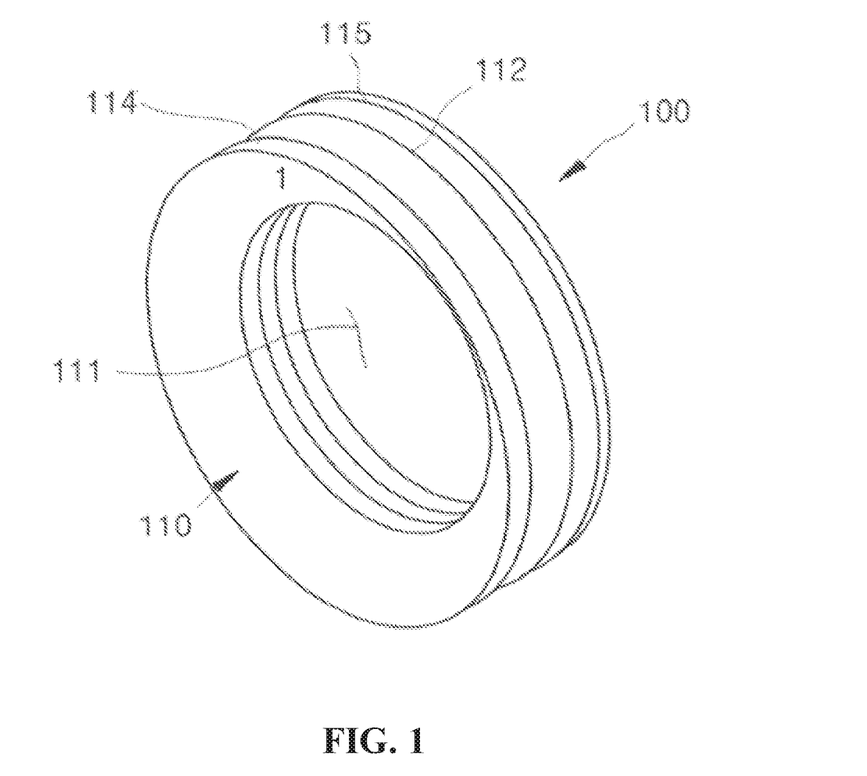
FIG. 1 is a perspective view illustrating a link seal of a crawler track according to a first embodiment of the present invention.
Figure 2:
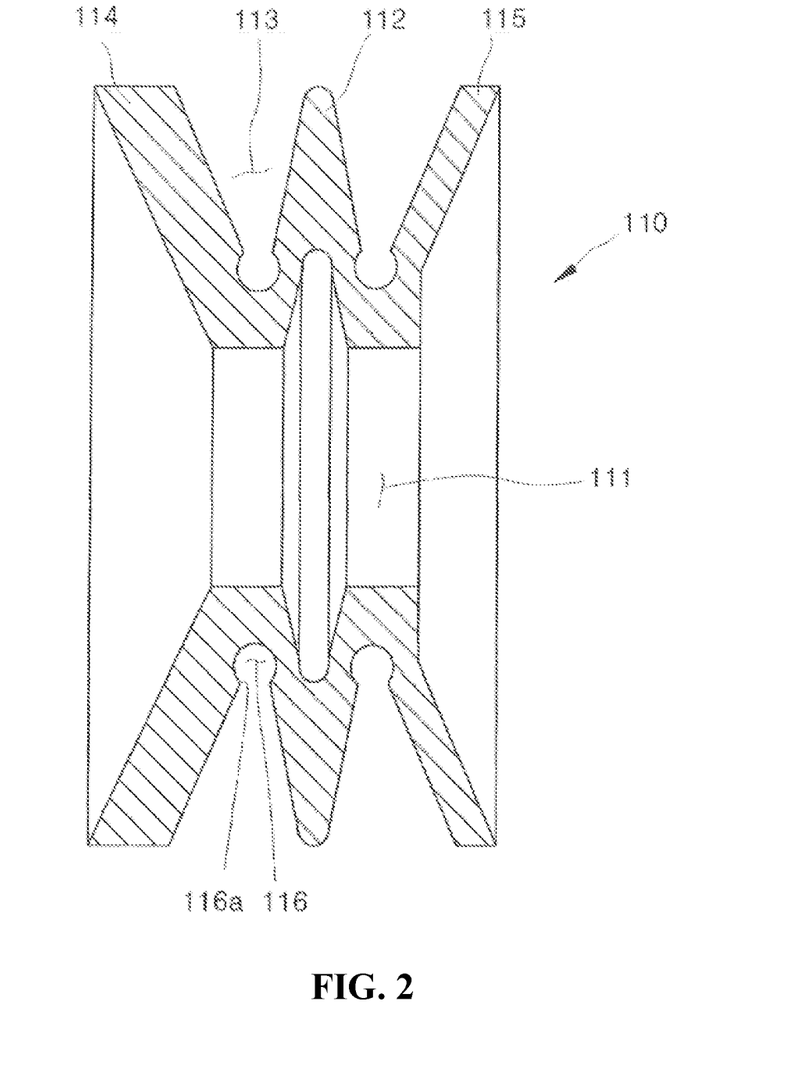
FIG. 2 is a cross-sectional view illustrating a link seal body, which is first molded to form a link seal of a crawler track according to a first embodiment of the present invention.
Figure 3:
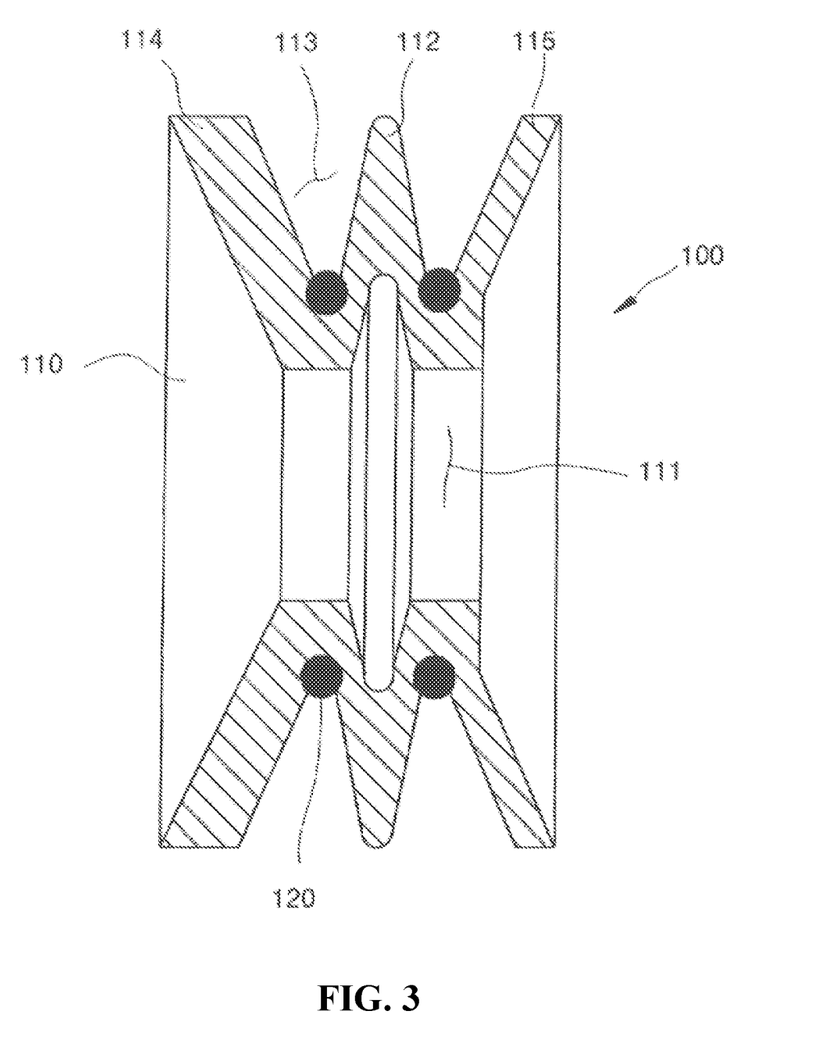
FIG. 3 is a cross-sectional view illustrating a state in which a shape restoration part is secondarily molded on the link seal body illustrated in FIG. 2.

In this case, the link seal 100 is manufactured through the steps of: first molding the link seal body 110 using a first synthetic resin material; and secondarily forming the shape restoration part 120 on the link seal body 110 through double injection a second synthetic resin material.

Hereinafter, the present invention will be explained more specifically.

First, the link seal body 110 has a donut shape, the insertion hole 111 is perforated at the inner center, through which the fixing pin 3 of the crawler track passes, the support part 112 protrudes from the outer center, and the first and second elastic parts 114 and 115 are continuously formed on both sides of the support part 112, such that the contact space parts 113 with a certain space are formed continuously. Of course, contact space parts may be further continuously formed on the inner side of the insertion hole 111.

At this time, the support part 112 may be formed to be inclined in both directions from the top or may be formed in various shapes.

Moreover, the first and second elastic parts 114 and 115 have a certain thickness, and may be extended from both ends of the support part 112, and may be extended to be inclined at a certain angle or formed vertically, but the present invention is not limited thereto, and may be naturally made in various shapes and forms.

Furthermore, the contact space part 113, which is formed between the support part 112 and the first and second elastic parts 114 and 115, may have various shapes and forms according to the support part 112 and the first and second elastic parts 114 and 115.

The link seal body 110 is preferably injection-molded with a first synthetic resin material, which is a high-strength resin material with elasticity, for example, polycarbonate (PC), but the resin material is not limited thereto, and various materials known to have elasticity may be applied.

On the other hand, the shape restoration part 120 is integrally formed on a portion or the entire of the contact space part 113 of the link seal body 110 to enhance the restorative force of the link seal body 110. It is preferable to form the shape restoration part 120 by double injecting the second synthetic resin material into the link seal body 110. The second synthetic resin material may be synthetic rubber, for example, EPDM (Ethylene-Propylene Diene Monomer).

The EPDM is a durable material. The EPDM is similar to many other rubber materials in that they are strong against high temperatures, but the EPDM is excellent at low temperature compatibility. Of course, the second synthetic resin material can evenly apply various materials with similar physical properties, including rubber or silicone materials other than EPDM.

Such a shape restoration part 120 is integrally formed at the boundary portion between the support part 112 and the first and second elastic parts 114 and 115 inside the contact space part 113 of the link seal body 110. Of course, the shape restoration part can be further formed if contact space parts are further continuously formed on the inner side of the insertion hole 111.

More specifically, in order to prevent the shape restoration part 120 from being separated from the link seal body 110 during use due to different properties between the first and second synthetic resin materials that form the link seal body 110 and the shape restoration part 120, a molding groove 116 having a support flange 116a with a narrow entrance at the inner side of the contact space part 113 is formed when the link seal body 110 is primarily injection-molded. Then, the second synthetic resin is injected and hardened into the molding groove 116 of the link seal body 110 through secondary double-injection to form the shape restoration part 11.

In this case, the molding groove 116 has a cross section of a circular structure, in which an opening is formed. It is preferable that the shape restoration part 120 is formed to have a ring shape with a generally circular cross-section. Of course, the cross-section of the molding groove 116 and the shape restoration part 120 is not limited to this, and may have various cross-sectional shapes such as a semi-circle, a triangle, a rhombus, a trapezoid, etc., and such a degree of design change also falls within the scope of the present invention.

Such a shape restoration part 120 can prevent the shape restoration part 120 from being separated from the link seal body 110 during compression and expansion of the link seal 100 since being supported to be prevented from separation by the support flange 116a when the shape restoration part 120 is integrally formed on the molding groove 116 of the link seal body 110.

As described above, in the case in which the shape restoration part 120 is formed on the molding groove 116 of the link seal body 110 through double injection, there is no need to fit additional ring-shaped shape restoration part, so the assembly of the link seal 100 is unnecessary, the structure is simple, and the restorative force of the link seal 100 can be maintained for a long time since there is no drooping of the ring-shaped shape restoration part, and the manufacturing cost of the link seal 100 can be significantly reduced.

Figure 5:
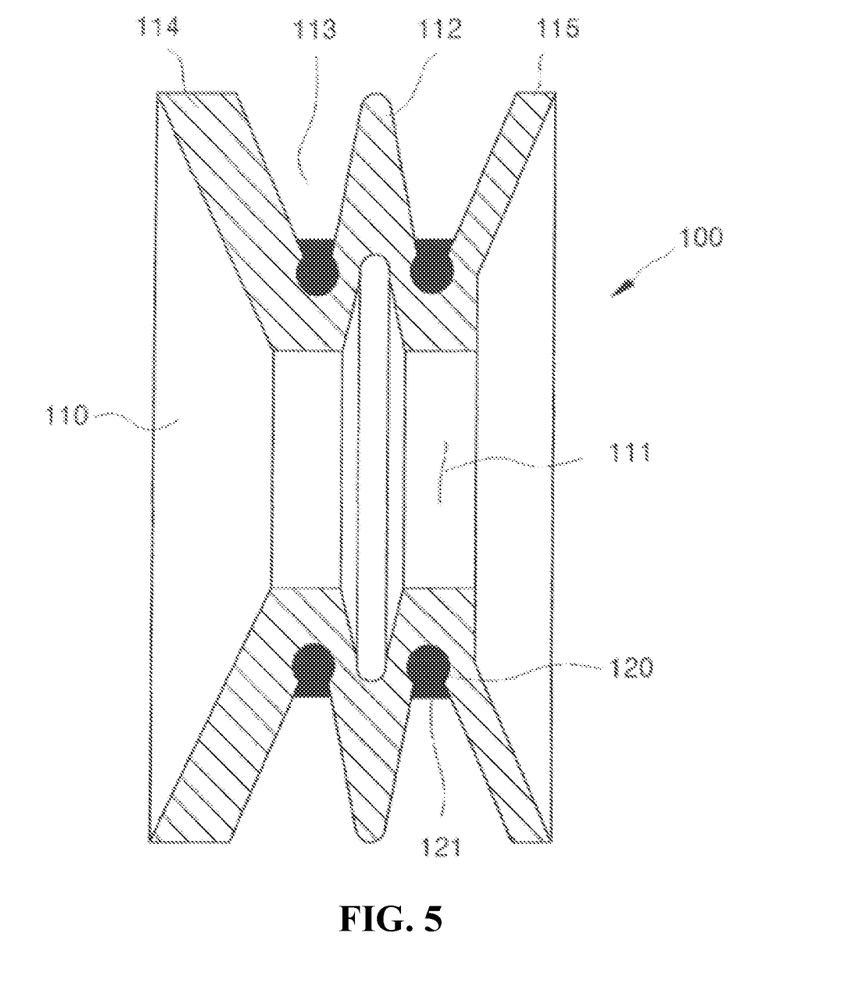
FIG. 5 is a cross-sectional view illustrating a link seal of a crawler track according to a second embodiment of the present invention.

Meanwhile, FIG. 5 is a view for depicting a link seal of a crawler track according to a second embodiment of the present invention.

In a case in which the shape restoration part 120 is formed on the molding groove 116 of the link seal body 110 through double injection, a retaining protrusion 121, which protrudes outward from the support flange 116a, is further extended to strengthen the coupling between the molding groove 116 of the link seal body 110 and the shape restoration part 120, thereby further preventing the shape restoration part 120 from being separated from the molding groove 116 of the link seal body 110.

Of course, in the drawing, the retaining protrusion 121 of the shape restoration part 120 is depicted as having a flat end, but it is not limited thereto, and the end of the retaining protrusion 121 can be changed in design to have various cross-sectional shapes, such as a dome structure which protrudes in the center.

Figure 6:
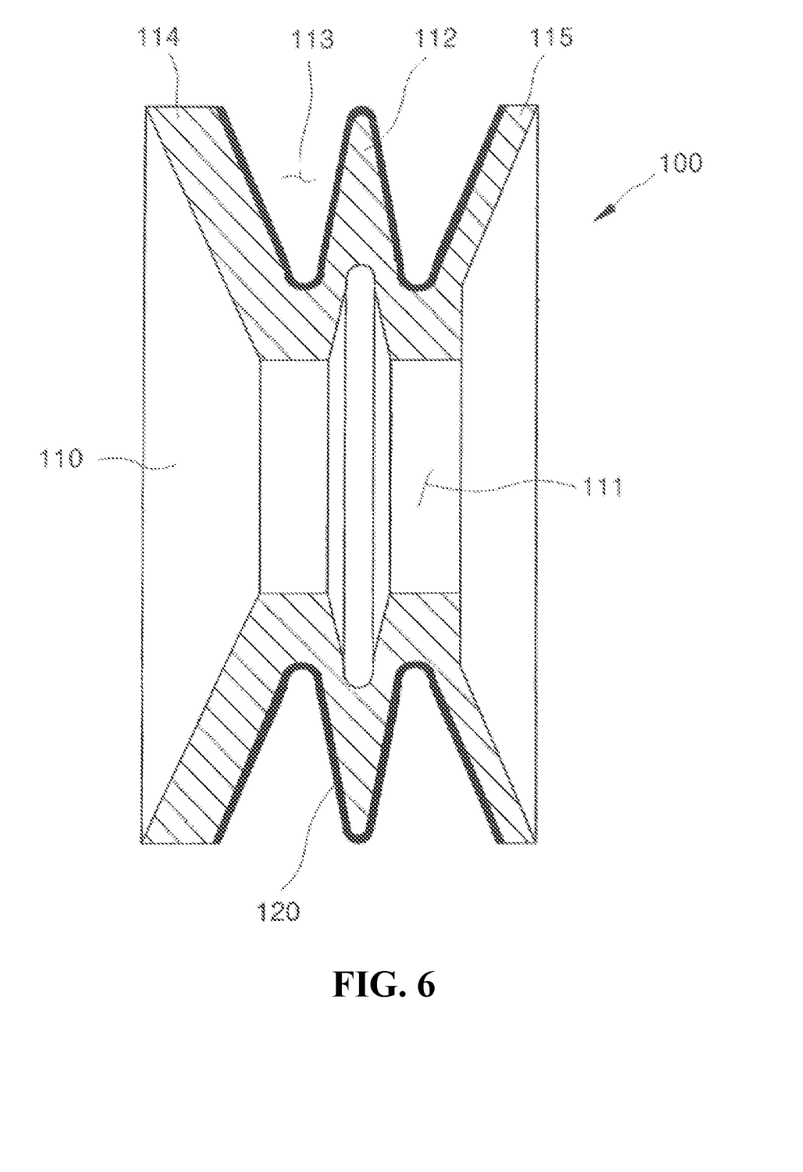
FIG. 6 is a cross-sectional view illustrating a link seal of a crawler track according to a third embodiment of the present invention.

In addition, FIG. 6 is a view for depicting a link seal of a crawler track according to a third embodiment of the present invention.

According to this, the shape restoration part 120 may be formed uniformly along the outer surface of the link seal body 110 to have a set thickness (for example, 0.5 to 1.0 mm). For example, the shape restoration part 120 may be formed at a uniform thickness through double-injecting of EPDM, which is a second synthetic resin material, on the support part 112, which forms the contact space part 113, and the first and second elastic parts 114 and 115.

As described above, in the case in which the shape restoration part 120 is formed on the link seal body 110, the present invention can enhance the restorative force of the first and second elastic parts 114 and 115, and prevent the wear of the first and second elastic parts 114 and 115 and the support part 112, thereby extending the lifespan of the link seal 100.

As described above, the operation of the link seal of the crawler track according to the present invention has been described referring to FIGS. 1 to 7.

Figure 4:
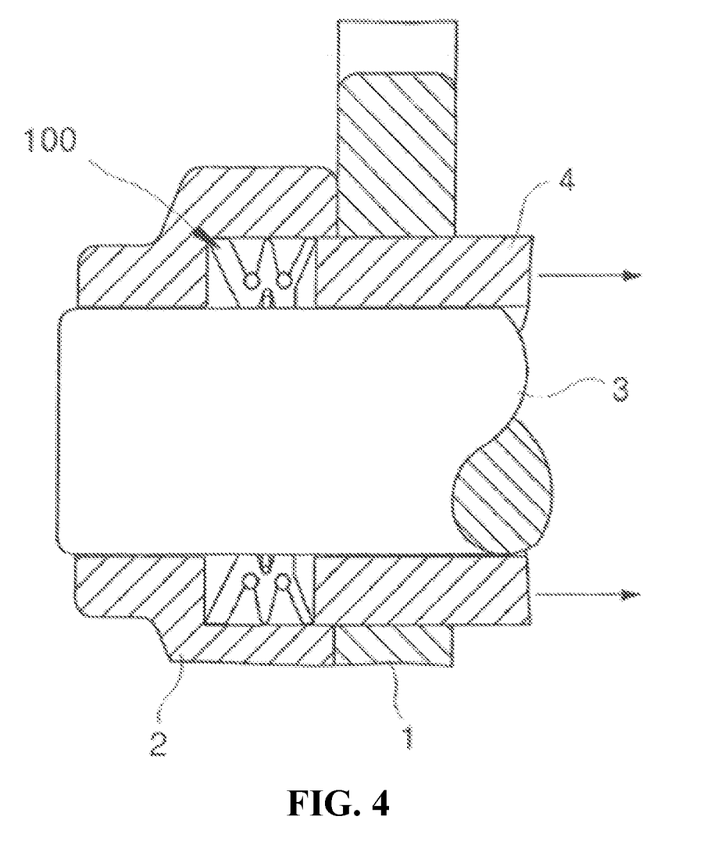
FIG. 4 is a cross-sectional view illustrating an installation example of a link seal of a crawler track according to the first embodiment of the present invention.

First, when impact force is applied in an axial direction of a bush 4, the link seal 100 undergoes compression and expansion. When the impact force is transmitted in the axial direction to the bush 4, the link seal 100 is compressed together, and expansion force, which returns the contact space part 113 of the link seal body 110 to an original position by repulsive force of the shape restoration part 120, is generated. Subsequently, when the bush 4 retracts, the expansion force of the shape restoration part 120 is transferred to the link seal body 110, so the restorative force to restore the link seal 100 to its original position is maximized.

Even when the above operation is performed repeatedly, the present invention can minimize the decrease in the restorative force of the link seal 100 due to the shape restoration part 120. As described above, the present invention can reduce the wear of the link seal 100, such as bias wear, prevent oil leakage, and block the entry of foreign substances from the outside, thereby further extending the lifespan.

As described above, while the present invention has been particularly shown and described with reference to the example embodiments thereof, it will be understood by those of ordinary skill in the art that the above embodiments of the present invention are all exemplified and various changes, modifications and equivalents may be made therein without changing the essential characteristics and scope of the present invention. Therefore, it would be understood that the embodiments disclosed in the present invention are not to limit the technical idea of the present invention but to describe the present invention, and the technical and protective scope of the present invention shall be defined by the illustrated embodiments. It should be also understood that the protective scope of the present invention is interpreted by the following claims and all technical ideas within the equivalent scope belong to the technical scope of the present invention.

The invention claimed is:

1. A link seal of a crawler track comprising: a link seal body placed between a pin and an outer link, which has a doughnut shape, and includes an insertion hole formed penetratingly at the inner center, a support portion protruding from the outer center, and first and second elastic parts protruding from both sides of the support part to be spaced apart from each other and to have contact space parts with a certain space; and a shape restoration part, which is integrally formed the link seal body to enhance restorative force of the link seal body, wherein a support flange with a narrow entrance is formed on the inner side of the contact space part to prevent separation of the shape restoration part, and wherein the shape restoration part is integrally bonded to a molding groove of the link seal body through dual injection with ethylene propylene diene monomer.

2. A method of manufacturing a link seal of a crawler track placed between a pin and an outer link, comprising: a first step of molding a link seal body in such a way that an insertion hole of a doughnut shape is penetratingly formed at the inner center using a first synthetic resin material, a support portion protrudes from the outer center, and first and second elastic parts protrude from both sides of the support part to be spaced apart from each other and to have contact space parts with a certain space; and a second step of molding a shape restoration part on a portion or the entire of the link seal body with a second synthetic resin material through double-injection with ethylene propylene diene monomer, wherein in the first step, the link seal body has a support flange with a narrow entrance, which is formed on the inner side of the contact space part to prevent separation of the shape restoration part.

\* \* \* \* \*